US 9,003,468 B2

(12) United States Patent
Uehara et al.

(10) Patent No.: US 9,003,468 B2
(45) Date of Patent: Apr. 7, 2015

(54) AUTOMATIC PERFORMANCE DEVICE

(75) Inventors: Haruki Uehara, Hamamatsu (JP);
Fukutaro Okuyama, Hamamatsu (JP);
Taro Yokoyama, Irvine, CA (US); Kenji Matahira, Iwata (JP)

(73) Assignee: Yamaha Corporation, Hamamatsu-shi (JP)

(*) Notice: Subject to any disclaimer, the term of this patent is extended or adjusted under 35 U.S.C. 154(b) by 91 days.

(21) Appl. No.: 13/978,385

(22) PCT Filed: Jan. 7, 2011

(86) PCT No.: PCT/JP2011/050222
§ 371 (c)(1),
(2), (4) Date: Jul. 3, 2013

(87) PCT Pub. No.: WO2012/093497
PCT Pub. Date: Jul. 12, 2012

(65) Prior Publication Data
US 2013/0283332 A1 Oct. 24, 2013

(51) Int. Cl.
*H04N 7/173* (2011.01)
*H04N 21/24* (2011.01)
(Continued)

(52) U.S. Cl.
CPC ............ *H04N 21/2402* (2013.01); *G10H 1/00* (2013.01); *H04N 21/4307* (2013.01); *H04N 21/8547* (2013.01); *H04N 21/4392* (2013.01); *G10H 1/0066* (2013.01); *G10H 1/368* (2013.01);
(Continued)

(58) Field of Classification Search
USPC ............................................. 725/93–94, 116
See application file for complete search history.

(56) References Cited

U.S. PATENT DOCUMENTS

| 2003/0174796 A1 | 9/2003 | Isozaki |
| 2005/0056141 A1 | 3/2005 | Uehara |
| 2005/0172790 A1 | 8/2005 | Tada |
| 2008/0147558 A1* | 6/2008 | Kraus ............................ 705/59 |

FOREIGN PATENT DOCUMENTS

| JP | 2001-331176 A | 11/2001 |
| JP | 2003-029771 A | 1/2003 |

(Continued)

OTHER PUBLICATIONS

International Search Report mailed Feb. 15, 2011, for International Application No. PCT/JP2011/050222 filed Jan. 7, 2011, 6 pages.
(Continued)

*Primary Examiner* — Hunter B Lonsberry
(74) *Attorney, Agent, or Firm* — Morrison & Foerster LLP

(57) ABSTRACT

An automatic performance device includes a performance data receiving unit that receives performance data transmitted from a storage device without passing through a moving image distribution server, the storage device configured to store the performance data having a combination of performance information and time information, the time information indicating the time when the performance indicated by the performance information was carried out; a synchronization signal receiving unit that receives a synchronization signal by using an audio signal transmission path for an audio via the moving image distribution server; and a reproducing unit that reproduces the performance information of the performance data in synchronization with a video distributed at the time when the synchronization signal is distributed, at the timing corresponding to the time indicated by the time information and the time indicated by the synchronization signal.

7 Claims, 12 Drawing Sheets

(51) Int. Cl.
  *G10H 1/00* (2006.01)
  *H04N 21/43* (2011.01)
  *H04N 21/8547* (2011.01)
  *H04N 21/439* (2011.01)
  *G10H 1/36* (2006.01)

(52) U.S. Cl.
  CPC .... *G10H2240/031* (2013.01); *G10H 2240/056* (2013.01); *G10H 2240/171* (2013.01); *G10H 2240/305* (2013.01); *G10H 2240/175* (2013.01)

(56) References Cited

FOREIGN PATENT DOCUMENTS

| | | |
|---|---|---|
| JP | 2003-167575 A | 6/2003 |
| JP | 2003-271156 A | 9/2003 |
| JP | 2005-084578 A | 3/2005 |
| JP | 2005-221657 A | 8/2005 |
| JP | 2008-216889 A | 9/2008 |
| JP | 2010-151936 A | 7/2010 |

OTHER PUBLICATIONS

Tsuyoshi Hisamatsu et al, "Design of Reproduction System for Multi Streams on the Internet", IEICE Technical Report, Jun. 16, 2005, vol. 105, No. 127, pp. 13-16.

European Search Report dated Aug. 1, 2014, for EP Application No. 11854805.6, twelve pages.

Lazzaro, J. et al. (Jun. 25, 2001). "A Case for Network Musical Performance," procedings of the 11th, International workshop on network and operating systems, support for digital audio and video, Nossdav, 2001, Port Jefferson, NY, ten pages.

\* cited by examiner

| INSTRUMENT ID | DATE/TIME INFORMATION | PERFORMANCE INFORMATION |
|---|---|---|
| ID0001 | 2010-12-28 T19:00:00:00 | MIDI MESSAGE #a1 |
| ID0001 | 2010-12-28 T19:00:02:24 | MIDI MESSAGE #a2 |
| ID0001 | 2010-12-28 T19:00:03:59 | MIDI MESSAGE #a3 |
| ... | ... | ... |

241

SYNCHRONIZATION SIGNAL

| INSTRUMENT ID | TIME CODE (ABSOLUTE TIME) |

FIG. 11

| PERFORMANCE FILE IDENTIFIER | INSTRUMENT ID | PERFORMANCE STARTING DATE/TIME | PERFORMANCE ENDING DATE/TIME |
|---|---|---|---|
| F0001 | 0001 | 2010-12-28 T19:00:00:00 | 2010-12-28 T19:31:23::05 |

AUTOMATIC PERFORMANCE DEVICE

CROSS-REFERENCE TO RELATED APPLICATIONS

This application is a National Phase application under 35 U.S.C. §371 of International Application No. PCT/JP2011/050222 filed Jan. 7, 2011, the content of which is herein incorporated by reference in its entirety for all intended purposes.

TECHNICAL FIELD

The present invention relates to a technology for carrying out an automatic performance in synchronization with video.

BACKGROUND ART

A technology is available which reproduces an instrument performance carried out at a remote place by carrying out an automatic performance using an automatic performance device. Patent Document 1 discloses that in a system for transmitting and receiving performance data, such as MIDI data, to be used for an automatic performance, and an audio/video signal indicating distributed video and distributed audio through separate transmission systems, the audio/video signal and the performance data are reproduced synchronously at a receiving-side system. More specifically, in the case that a click signal is generated, a transmitting-side system transmits the click signal in a state of being included in the audio signal while a time stamp is added to click time data indicating the click generation time on the basis of the internal clock of the transmitting-side system. The receiving-side system corrects its internal clock so that the time when the click signal was received becomes coincident with the time indicated by the click time data, and carries out an automatic performance in synchronization with the video on the basis of the corrected internal clock.

Patent Document 1: JP-A-2005-84578

DISCLOSURE OF THE INVENTION

Problem that the Invention is to Solve

In the technology disclosed in Patent Document 1, the transmitting-side system almost simultaneously transmits the click generation time specified on the basis of the internal clock and the click signal generated regardless of the internal clock through separate transmission systems. However, the relative delay between the click signal and the click time data at the time when received at the receiving-side system is not considered particularly in the technology disclosed in Patent Document 1. In the technology, the click signal and the click time data, the time difference therebetween being within a predetermined time interval, are corresponded to each other by assuming that they have been transmitted at the same time; however, in the case that the communication delay in one of the transmission paths is extremely large, for example, the click signal and click time data having been transmitted almost simultaneously are not corresponded to each other properly, whereby the internal clock at the receiving-side system may not be corrected properly in some cases.

In consideration of the above-mentioned problem, an object of the present invention is to carry out an automatic performance in synchronization with a video distributed by a moving image distribution server while suppressing the influence of the state of the communication path passing through the moving image distribution server.

Means for Solving the Problem

For the purpose of attaining the above-mentioned object, the present invention is characterized in that there is provided an automatic performance device from a performance information output device in synchronization with video distributed by a moving image distribution server for distributing the video and an audio, the automatic performance device comprising:

a performance data receiving unit that receives performance data transmitted from a storage device without passing through the moving image distribution server, the storage device configured to store the performance data having a combination of the performance information and the time information, the performance information being output from the performance information, the time information indicating the time when the performance indicated by the performance information was carried out, and the time being measured by the dock section of the performance information output device;

a synchronization signal receiving unit that receives a synchronization signal transmitted from the performance information output device by using an audio signal transmission path for the audio via the moving image distribution server, the synchronization signal indicating the time measured by the dock section; and a reproducing unit that reproduces the performance information of the performance data in synchronization with the video distributed at the time when the synchronization signal is distributed, at the timing corresponding to the time indicated by the time information of the performance data received by the performance data receiving unit and the time indicated by the synchronization signal received by the synchronization signal receiving unit.

With the present invention, an automatic performance synchronized with the video distributed by the moving image distribution server can be carried out while suppressing the influence of the state of the communication path passing through the moving image distribution server.

The present invention may be configured as follows: the automatic performance device further comprises a buffering unit configured to buffer the performance data received by the performance data receiving unit in a buffering area, and the reproducing unit reads the performance information of the buffered performance data from the buffering area and reproduces the performance information in parallel with the buffering by the buffering unit.

In the present invention, while the reproducing unit reproduces the performance information, the synchronization signal receiving unit receives the synchronization signal in a predetermined cycle; if the synchronization signal has not been received within a predetermined period longer than the cycle, the reproducing unit continuously reproduces the performance information, and if the synchronization signal has not been received beyond the period, the reproduction of the performance information may be stopped.

The present invention may be configured as follows: in addition to the performance information and the time information, the storage device stores an identifier for identifying the performance information output device or a performance information group serving as a group of the performance information, the synchronization signal is a signal indicating the identifier and the time when the performance was carried out, and the reproducing unit reproduces the performance information of the performance data including the identifier indicated by the synchronization signal, and does not reproduce the performance information of the performance data including the other identifiers.

Furthermore, a storage device being capable of communicating with a performance information output device for outputting performance information and an automatic performance device for reproduction the performance information in synchronization with a video distributed by a moving image distribution server for distributing the video and an audio, the storage device comprising:

a performance data receiving unit that receives performance data having a combination of the performance information and the time information from the performance information output device each time the performance information is generated by the performance information output device without passing through the moving image distribution server, the time information indicating the time when the performance indicated by the performance information was carried out, a storing unit that stores the performance data received by the performance data receiving unit; and a performance data transmitting unit that transmits the performance data stored in the storing unit to the automatic performance device without passing through the moving image distribution server in parallel with the storing of the performance data received by the storing unit.

With the present invention, an automatic performance synchronized with the video distributed by the moving image distribution server can be carried out while suppressing the influence of the state of the communication path passing through the moving image distribution server.

Moreover, performance information output device being capable of communicating with a storage device and an automatic performance device for reproducing performance information in synchronization with a video distributed by a moving image distribution server for distributing the video and an audio, the performance information output device comprising:

a performance information generating unit that generates performance information;

a clocking unit that measures time;

a performance data transmitting unit that transmits performance data having a combination of time information and the performance information to the storage device without passing through the moving image distribution server each time the performance information is generated by the performance information generating unit, the time information indicating the time measured by the clocking unit; and a synchronization signal transmitting unit that transmits a synchronization signal indicating the time being measured by the clocking unit to the moving image distribution server via the audio signal transmission path for the audio.

Still further, a performance system according to the present invention comprising;

a performance information output device that outputs performance information;

a storage device; and an automatic performance device that reproduces the performance information in synchronization with a video distributed by a moving image distribution server for distributing the video and an audio, wherein the performance information output device includes:

a performance information generating unit that generates performance information;

a clocking unit that measures time;

a first performance data transmitting unit that transmits performance data having the combination of time information and the performance information to the storage device without passing through the moving image distribution server each time the performance information is generated by the performance information generating unit, the time information indicating the time measured by the clocking unit; and a synchronization signal transmitting unit that transmits a synchronization signal indicating the time being measured by the clocking unit to the moving image distribution server using the audio signal transmission path for the audio;

wherein the storage device includes:

a first performance data receiving unit that receives the performance data transmitted through the first performance data transmitting unit;

a storing unit that stores the performance data received by the performance data receiving unit; and a second performance data transmitting unit that transmits the performance data stored in the storing unit to the automatic performance device without passing through the moving image distribution server in parallel with the storing of the performance data received by the storing unit; and wherein the automatic performance device includes:

a second performance data receiving unit that receives the performance data transmitted through the second performance data transmitting unit;

a synchronization signal receiving unit that receives the synchronization signal transmitted through the synchronization signal transmitting unit from the moving image distribution server using the transmission path; and a reproducing unit that reproduces the performance information of the performance data in synchronization with the video distributed at the time when the synchronization signal is distributed, at the timing corresponding to the time indicated by the time information of the performance data received by the second performance data receiving unit and the time indicated by the synchronization signal received by the synchronization signal receiving unit.

With the present invention, an automatic performance synchronized with the video distributed by the moving image distribution server can be carried out while suppressing the influence of the state of the communication path passing through the moving image distribution server.

BRIEF DESCRIPTION OF THE DRAWINGS

FIG. 11 is a view showing a format example of a performance table;

DESCRIPTION OF REFERENCE NUMERALS AND SIGNS

Figure 1:
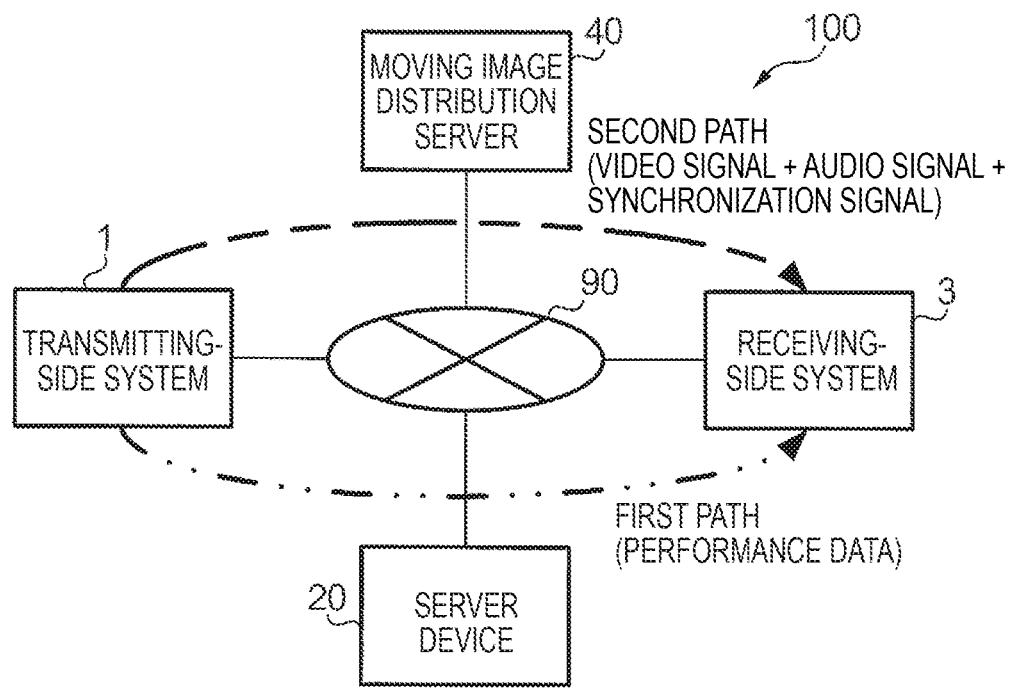
FIG. 1 is a view showing a schematic configuration of a performance system 100.

1 . . . transmitting-side system, 10 . . . instrument terminal, 100 . . . performance system, 101 . . . video camera, 102 . . . HDD recorder, 103 . . . delay device, 104, 301 . . . PC, 105 . . . synthesizing section, 11 . . . control section, 111, 311 . . . clock section, 112 . . . performance information generation section, 113 . . . second performance data transmission section, 114 . . . synchronization signal transmission section, 12 . . . storage section, 13 . . . musical sound generation section, 14 . . . speaker, 15 . . . operation section, 16 . . . display section, 17 . . . communication section, 18 . . . performance section, 19 . . . signal transmission section, 20 . . . server device, 21 . . . control section, 211 . . . first performance data receiving section, 212 . . . second performance data transmission section, 22 . . . first communication section, 23 . . . second communication section, 24 . . . storage section, 241 . . . performance data group, 3 . . . receiving-side system, 30 . . . automatic performance instrument, 302 . . . separation section, 31 . . . control section, 312 . . . second performance data receiving section, 313 . . . buffering section, 314 . . . synchronization signal receiving section, 315 . . . clock correction section, 316 . . . reproduction section, 32 . . . storage section, 33 . . . operation section, 34 . . . display section, 35 . . . signal receiving section, 36 . . . communication section, 37 . . . data buffer, 38 . . . performance section, 40 . . . moving image distribution server, 90 . . . communication network

BEST MODES FOR CARRYING OUT THE INVENTION (Configuration of Performance System 100)

An embodiment according to the present invention will be described below referring to the drawings.

FIG. 1 is a view showing a schematic configuration of a performance system 100 according to this embodiment. As shown in FIG. 1, the performance system 100 includes a transmitting-side system 1, a server device 20 and a receiving-side system 3, and these are connected via a communication network 90. The communication network 90 is a communication network including the Internet in this configuration. In addition to the respective devices of the performance system 100, a moving image distribution server 40 is connected to the communication network 90. The moving image distribution server 40 provides the so-called moving image sharing service for distributing moving images including video and audio accessible by unspecified users. The moving image distribution server 40 provides a platform for video streaming, for example, thereby being capable of distributing moving images (hereafter referred to as "live moving images") including video and audio. In this embodiment, the moving image distribution server 40 can communicate with both the transmitting-side system 1 and the receiving-side system 3, thereby realizing a function of distributing the live moving images provided by the transmitting-side system 1 to the receiving-side system 3.

The live moving images according to this embodiment include a moving image that is distributed while being delayed by a predetermined time by a delaying process after the image is taken.

The transmitting-side system 1 is configured at a place where a concert or the like in which musical instruments are played is held. The transmitting-side system 1 is equipped with, for example, apparatuses required for distributing video and audio in which the scene of an instrument performance was photographed and recorded to the moving image distribution server 40 and apparatuses required for allowing the instrument performance to be reproduced by carrying out an automatic performance at the receiving-side system 3. The receiving-side system 3 is configured at a place on the side of the audience of the automatic performance and is equipped with apparatuses required for the user to watch the video in which the scene of the instrument performance was photographed and apparatuses required for reproducing the instrument performance by carrying out the automatic performance. The server device 20 can communicate with both the transmitting-side system 1 and the receiving-side system 3 and serves as a storage device having a role of relaying data required for the automatic performance between the two systems.

The transmitting-side system 1 transmits data to the receiving-side system 3 through two kinds of communication paths being different from each other. First, the transmitting-side system 1 transmits performance data through a first path via the communication network 90 and the server device 20 and without passing through the moving image distribution server 40. The performance data will be described later in detail. Secondly, the transmitting-side system 1 transmits data, such as a video signal and an audio signal, for use in the broadcast of live moving images through a second path via the communication network 90 and the moving image distribution server 40 without passing through the server device 20. In addition, the data to be transmitted through the second path further includes a synchronization signal that is used to synchronize the video (and audio) represented by a video signal on the side of the receiving-side system 3 with the automatic performance that is carried out on the basis of the performance data. The audio signal and the synchronization signal are transmitted and received via an audio signal transmission path with two channels, L and R channels.

The first path and the second path are common in some portions because they pass through the communication network 90 but they are made different in the other portions. Since it may be said that the first path and the second path are transmission systems being independent of each other as described above, the communication situations thereof (for example, the degree of communication delay) may be different from each other.

(Configuration of Transmitting-Side System 1)

Figure 2:
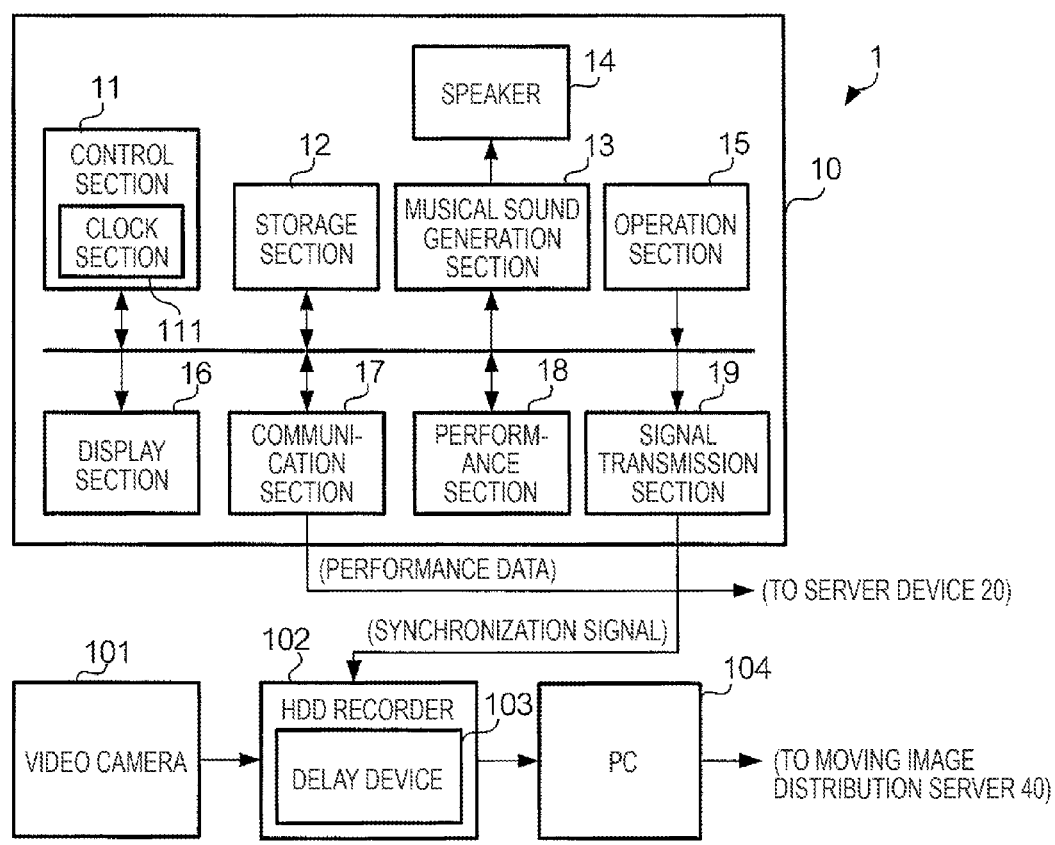
FIG. 2 is a block diagram showing a configuration of a transmitting-side system 1.

FIG. 2 is a block diagram showing a configuration of the transmitting-side system 1. As shown in FIG. 2, the transmitting-side system 1 includes an instrument terminal 10, a video camera 101, an HDD (Hard Disc Drive) recorder 102, and a PC (Personal Computer) 104.

First, the configuration of the instrument terminal 10 is described. The instrument terminal 10 is an electronic piano in this configuration and includes a control section 11, a storage section 12, a musical sound generation section 13, a speaker 14, an operation section 15, a display section 16, a communication section 17, a performance section 18, and a signal transmission section 19. As shown in FIG. 2, the respective sections of the instrument terminal 10, excluding the speaker 14, are connected mutually through a bus, and signal transfer is carried out among the respective sections via the bus.

The control section 11 includes a CPU (Central Processing Unit), a ROM (Read Only Memory) in which programs for controlling the respective sections of the instrument terminal 10 are stored, and a RAM (Random Access Memory) to be used as a work area when the programs are executed. The CPU executes the programs stored in the ROM and controls the respective sections of the instrument terminal 10. The control section 11 includes a clock section 111 and measures date/time (herein, the current date/time) using the clock section 111. Furthermore, the control section 11 generates a MIDI (Musical Instrument Digital Interface: registered trade name) message depending on the operation (hereafter referred to as "performance operation") carried out at the performance section 18 and generates performance data having the combination of the generated MIDI message, date/time information indicating the date/time when the performance was carried out, and an identifier (hereafter referred to as "instrument ID") for identifying the instrument terminal 10 itself. The MIDI message is MIDI format performance information representing the contents of the performance carried out by the instrument terminal 10. The date/time information is information including both date information indicating date and time information indicating time.

The date/time when the performance was carried out by the instrument terminal 10 is specified by the date/time measured by the clock section 111.

Figures 5, 6:
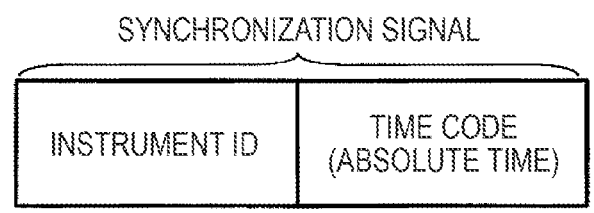
FIG. 5 is a view showing a data structure of a synchronization signal.
FIG. 6 is a view showing a data structure of a performance data group 241.

In addition, the control section 11 generates a synchronization signal that is used to carry out an automatic performance in synchronization with the video distributed by the moving image distribution server 40. FIG. 6 is a view showing a data structure of the synchronization signal. As shown in FIG. 6, the synchronization signal is a signal indicating "instrument ID" and "time code." The time code is the date/time measured by the clock section 111 and can be regarded as the date/time (that is, including absolute time) when the video signal, the audio signal and the synchronization signal are transmitted from the transmitting-side system 1 to the moving image distribution server 40. The time code is used to specify which date/time's performance the video distributed from the moving image distribution server 40 corresponds to at the receiving-side system 3 having received the respective signals. It is preferable that the synchronization signal should be generated so as to have frequency components similar to those of white noise and should not be unpleasant to the ears when a human being hears a sound equivalent to the synchronization signal.

The storage section 12 has a non-volatile memory and stores, for example, an instrument ID for identifying the instrument terminal 10. The storage section 12 herein stores "0001" as the instrument ID of the instrument terminal 10. The instrument ID may be determined beforehand at the production stage, may be set by the user of the instrument terminal 10, or may be set automatically by the control section 11 at the performance start time. The musical sound generation section 13 generates a musical sound signal corresponding to the MIDI message on the basis of the MIDI message and supplies the generated musical sound signal to the speaker 14. The speaker 14 outputs the performance sound of the instrument terminal 10 depending on the musical sound signal generated by the musical sound generation section 13. The operation section 15 has various buttons for operating the instrument terminal 10, and various instructions for the instrument terminal 10 are input by the user. The display section 16 has a liquid crystal display and displays various screens required for operating the instrument terminal 10.

The communication section 17 is connected to the communication network 90 and has an interface for carrying out communication via the communication network 90. The performance section 18 has, for example, a plurality of keys, and when the keys are operated by the performer of the instrument terminal 10, the performance of the instrument terminal 10 is carried out. When the keys are operated by the performer, the performance section 18 outputs an operation signal corresponding to the key operation to the control section 11. The signal transmission section 19 has a terminal to which an audio cable for connection to the HDD recorder 102 is connected, and transmits the synchronization signal supplied from the control section 11 to the HDD recorder 102 via the audio cable connected to this terminal.

The instrument terminal 10 having the above-mentioned configuration functions as a performance information output device for generating and outputting performance information. The configuration of the instrument terminal 10 has been described in the above.

The video camera 101 is used to photograph, for example, a scene in which the performer is playing the instrument terminal 10 and to generate a video signal indicating the video thereof and an audio signal obtained by picking up the sound around the instrument terminal 10. The video camera 101 transmits the generated video signal and audio signal to the HDD recorder 102. The HDD recorder 102 records, in the HDD thereof, the video signal and the audio signal transmitted from the video camera 101 and the synchronization signal transmitted from the signal transmission section 19. In this recording, the HDD recorder 102 records the audio signal using one of stereo channels and records the synchronization signal using the other channel. In other words, the audio signal generated by the video camera 101 becomes monaural at this time.

Furthermore, the HDD recorder 102 incorporates a delay device 103. The delay device 103 carries out a delay process for the video signal, the audio signal and the synchronization signals recorded in the HDD. This delay process is carried out to delay the transmission timing of each signal supplied from the HDD recorder 102 approximately 1 minute, for example. The reason why the delay process is carried out is that the automatic performance at an automatic performance piano 30 can be carried out more securely, and the action thereof will be described later.

It is assumed that the relationship among the video signal, the audio signal and the synchronization signal on the time axis remains unchanged before and after the delay process. Furthermore, it may be possible that the delay device 103 is externally connected between the HDD recorder 102 and the PC 104, instead of being incorporated in the HDD recorder 102.

The PC 104 has an interface for connection to the communication network 90, whereby the video signal, the audio signal and the synchronization signal transmitted from the HDD recorder 102 are transmitted to the moving image distribution server 40 via the communication network 90. The moving image distribution server 40 distributes the video signal, the audio signal and the synchronization signal received from the PC 104.

It takes, for example, approximately one minute from the time when the moving image distribution server 40 received the video signal, the audio signal and the synchronization signal from the PC 104 to the time when the moving image distribution server 40 distributes these signals to the receiving-side system 3. The delay is due to the delay process carried out intentionally by the moving image distribution server 40 and is adopted in general moving image sharing service in some cases.

(Configuration of Server Device 20)

Figure 3:
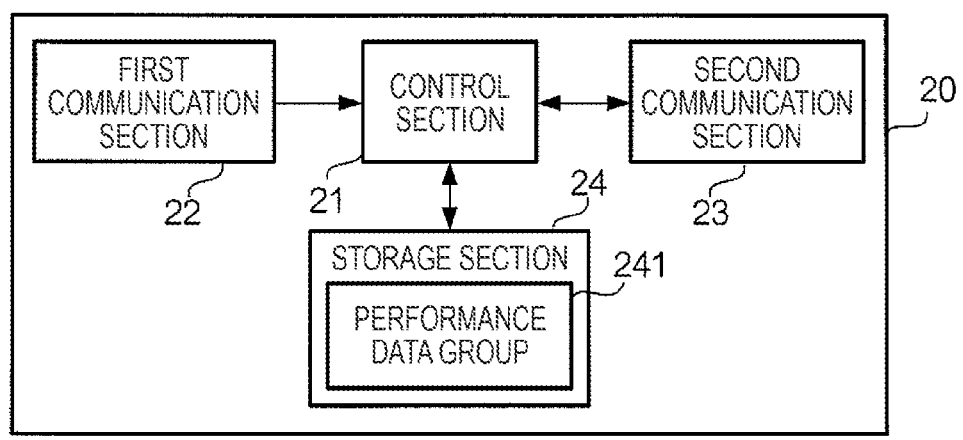
FIG. 3 is a block diagram showing a hardware configuration of a server device 20.

FIG. 3 is a block diagram showing the hardware configuration of the server device 20. As shown in FIG. 3, the server device 20 includes a control section 21, a first communication section 22, a second communication section 23, and a storage section 24.

The control section 21 has a CPU, a ROM in which programs for controlling the respective sections of the server device 20 are stored, and a RAM to be used as a work area when the programs are executed. The CPU executes the programs stored in the ROM and controls the respective sections of the server device 20. The first communication section 22 has an interface for connection to the communication network 90, thereby communicating with the instrument terminal 10. The second communication section 23 has an interface for connection to the communication network 90, thereby communicating with the automatic performance piano 30. The reason why the two communicating sections, i.e., the first communication section 22 and the second communication section 23, are provided is so that the control section 21 can carry out the process for receiving performance data from the instrument terminal 10 and for storing the performance data in the storage section 24 and the process for reading the performance data from the storage section 24 and for transmitting the performance data to the automatic performance piano 30 in parallel. Hence, provided that the parallel processes can be realized, the respective communicating sections may not be required to be independent of each other.

The storage section 24 has a hard disc device in which performance data group 241 including the performance data transmitted from the instrument terminal 10 and server programs for realizing server functions in the performance system 100 are stored. The CPU of the control section 21 executes the server programs, stores the performance data received from the instrument terminal 10 in the storage section 24, and transmits the performance data stored in the storage section 24 to the automatic performance piano 30.

FIG. 5 is a view showing a data structure of the performance data group 241. In the performance data group 241, the performance data corresponding to each performance at the instrument terminal 10 is formed of a group of an instrument ID, date/time information, and a MIDI message. For example, in the case that key operation is carried out at the instrument terminal 10, as shown in the first line of FIG. 5, the performance data having the combination of the instrument ID "0001" of the instrument terminal 10, the date/time information "2010-12-28T19:00:00:00" (indicating 19 o'clock 00 minutes 00 seconds 00 on Dec. 28, 2010) indicating the date/time when the key operation was carried out, and the performance information "MIDI message #1" is included in the performance data group 241. The performance data corresponding to each of the other lines has a data structure similar to this structure.

(Configuration of Receiving-Side System 3)

Figure 4:
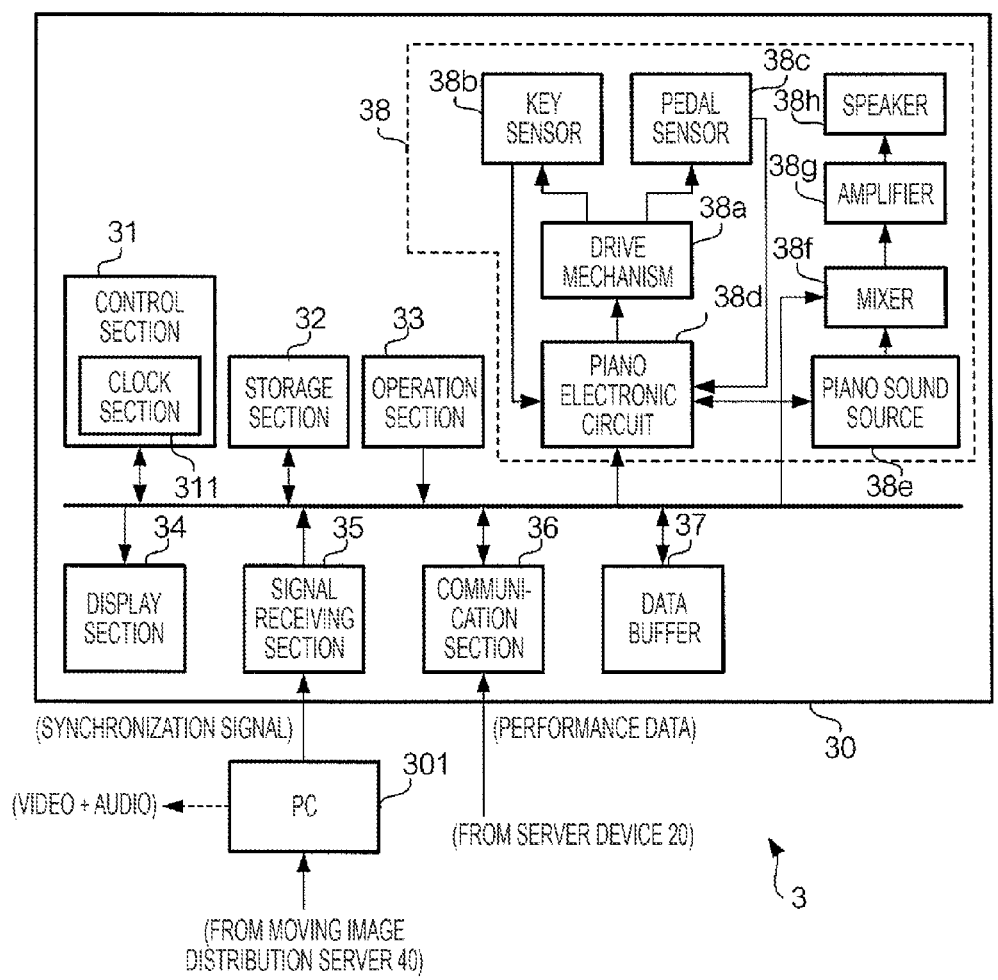
FIG. 4 is a block diagram showing a configuration of a receiving-side system 3.

FIG. 4 is a block diagram showing a configuration of the receiving-side system 3. As shown in FIG. 4, the receiving-side system 3 includes an automatic performance piano 30 and a PC 301. The PC 301 communicates with the moving image distribution server 40 via the communication network 90 and receives the video signal, the audio signal and the synchronization signal distributed from the moving image distribution server 40. The PC 301 reproduces the video signal and the audio signal among the received signals and outputs a live moving image using the monitor thereof or an external monitor. Furthermore, the PC 301 transmits the synchronization signal to the automatic performance piano 30 connected thereto via an audio cable.

Next, the configuration of the automatic performance piano 30 will be described. The automatic performance piano 30 has a function of carrying out an automatic performance on the basis of the MIDI message. The automatic performance piano 30 includes a control section 31, a storage section 32, an operation section 33, a display section 34, a signal receiving section 35, a communication section 36, a data buffer 37, and a performance section 38. The respective sections of the automatic performance piano 30 are connected mutually through a bus, and signal transfer is carried out among the respective sections via the bus.

The control section 31 has a CPU, a ROM in which programs for controlling the respective sections of the automatic performance piano 30 are stored, a RAM, etc. The CPU of the control section 31 reads and executes the programs stored in the ROM, thereby controlling the respective sections of the automatic performance piano 30. In addition, the control section 31 has a clock section 311 and measures date/time using the clock section 311. Furthermore, the control section 31 decodes the instrument ID and the time code from the synchronization signal received from the PC 301 through the signal receiving section 35 and specifies these. The control section 31 corrects the date/time measured by the clock section 311 on the basis of the time code, and specifies the performance data to be reproduced by using the instrument ID. Moreover, the control section 31 buffers the performance data received through the communication section 36 in the data buffer 37, and in parallel with this, the control section 31 reads the performance data buffered in the data buffer 37, reproduces the MIDI message included in the performance data, and allows the performance section 38 to carry out a performance (in other words, an automatic performance is carried out).

The storage section 32 has a hard disc device in which various programs and an instrument ID, etc. are stored. The instrument ID to be stored in the storage section 32 is set beforehand to, for example, "0002" different from the instrument ID "0001" of the instrument terminal 10. The instrument ID is inherent in the automatic performance piano 30. The operation section 33 has various buttons for operating the automatic performance piano 30, and various instructions for the automatic performance piano 30 are input by the user. The display section 34 has a liquid crystal display and displays various screens required for operating the automatic performance piano 30.

The signal receiving section 35 has a terminal to which the audio cable for connection to the PC 301 is connected, and receives the synchronization signal transmitted from the PC 301 that is connected to this terminal via the audio cable. The communication section 36 has an interface for connection to the communication network 90 and communicates with the server device 20. The data buffer 37 has a buffer area in which the performance data is buffered under the control of the control section 31. The control section 31 reads the performance data buffered in the data buffer 37 and supplies the MIDI message included in the performance data to the performance section 38 at the timing corresponding to the date/time information included in the performance data and the specified time code indicated by the synchronization signal received from the PC 301, thereby reproducing the MIDI message. According to the MIDI message, performance sound is output from the automatic performance piano 30.

The performance section 38 outputs performance sound according to the MIDI message extracted from the performance data and further outputs performance sound generated through the pressing operation of keys, not shown, by the user. The former is referred to as "automatic performance" and the latter is referred to as "manual performance."

The performance section 38 has a drive mechanism 38a, a key sensor 38b, a pedal sensor 38c, a piano electronic circuit 38d, a piano sound source 38e, a mixer 38f, an amplifier 38g, and a speaker 38h. The drive mechanism 38a has a plurality of keys and a plurality of pedals, and further has, for example, a group of drive solenoids provided so as to correspond to the respective keys. The key sensor 38b and the pedal sensor 38c are used for a manual performance and provided so as to correspond to each of the plurality of keys and the plurality of pedals. The key sensor 38b and the pedal sensor 38c detect the intensity, depth, etc. when the key and the pedal are pressed, and supply the results of the detection including the key number and the pedal number for specifying the key and the pedal detected, velocity information, etc. to the piano electronic circuit 38d. In the case that an automatic performance is carried out, the piano electronic circuit 38d supplies a MIDI message to the piano sound source 38e. The piano sound source 38e generates an audio signal for outputting the performance sound instructed by the MIDI message. Furthermore, the piano electronic circuit 38d controls the group of the drive solenoids provided in the drive mechanism 38a. More specifically, upon receiving a MIDI message indicating note ON (key pressing) for a certain performance sound, the piano electronic circuit 38d applies a drive current to the solenoid corresponding to the key of the performance sound, whereby a magnetic force required for pressing the key is generated by the solenoid. On the other hand, upon receiving an event indicating note OFF (key release) for a certain performance sound, the piano electronic circuit 38d applies a drive current to the solenoid corresponding to the key of the performance sound, whereby a magnetic force required for releasing the key is generated by the solenoid. What's more, in the case that a manual performance is carried out, the piano electronic circuit 38d generates an event on the basis of the results of the detection supplied from the key sensor 38b and the pedal sensor 38c, and supplies the event to the piano sound source 38e. The piano sound source 38e generates an audio signal for outputting the designated performance sound according to the MIDI message.

The audio signal generated by the piano sound source 38e as described above is output to the mixer 38f. The mixer 38f mixes the audio signal output from the piano sound source 38e with other audio signals as necessary, and outputs the obtained signal to the amplifier 38g. The signal is amplified by the amplifier 38g and output from the speaker 38h as the performance sound.

(Functional Configuration of Performance System 100)

Figure 7:
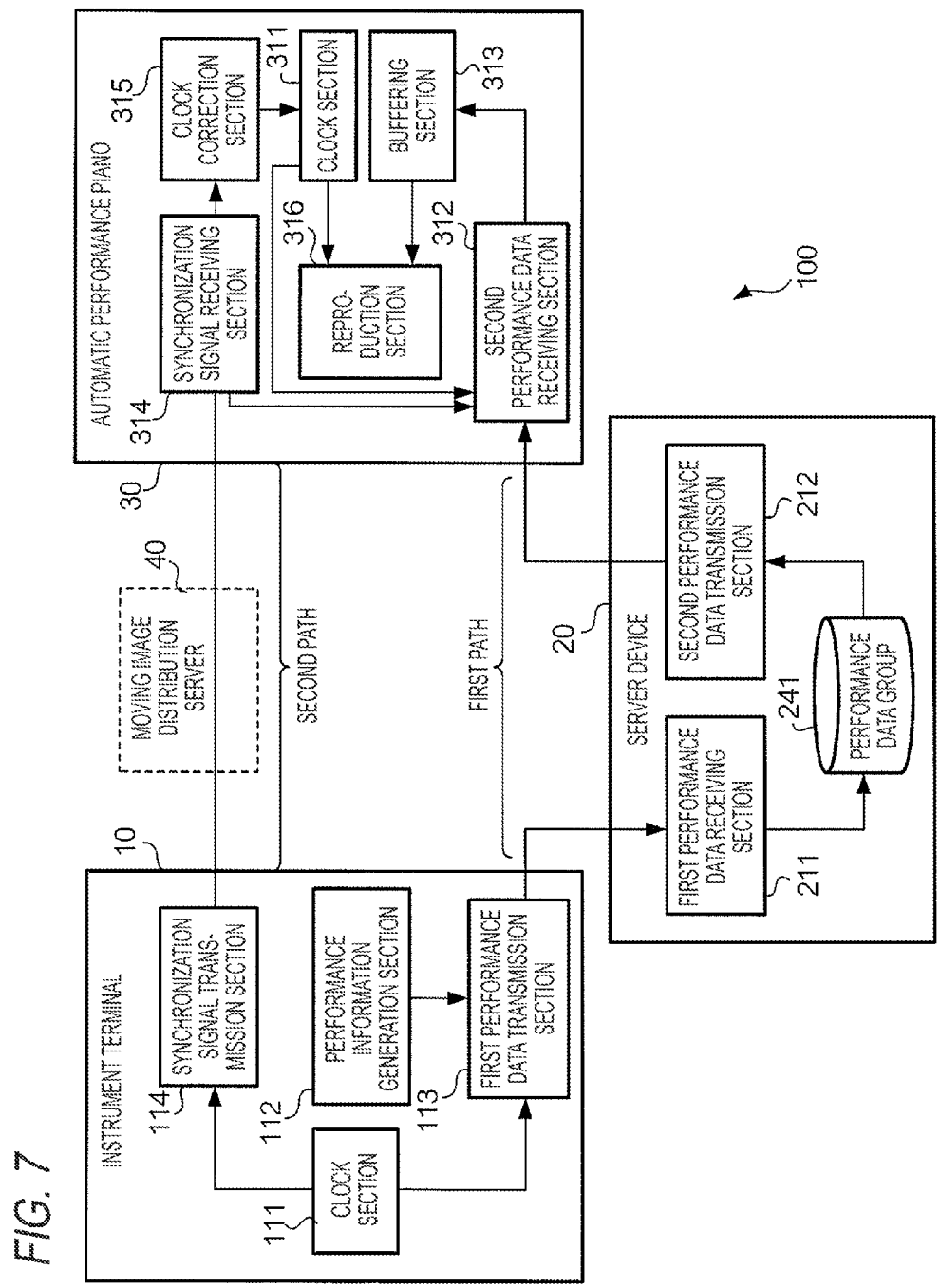
FIG. 7 is a functional block diagram showing a functional configuration of the performance system 100.

FIG. 7 is a functional block diagram showing a functional configuration of the performance system 100 relating to an automatic performance.

The instrument terminal 10 realizes functions corresponding to the clock section 111, a performance information generation section 112, a first performance data transmission section 113, and a synchronization signal transmission section 114. The server device 20 realizes functions corresponding to a first performance data receiving section 211 and a second performance data transmission section 212. The automatic performance piano 30 realizes functions corresponding to the clock section 311, a second performance data receiving section 312, a buffering section 313, a synchronization signal receiving section 314, a clock correction section 315, and a reproduction section 316.

The dock section 111 measures date/time as described above. The performance information generation section 112 generates a MIDI message serving as the performance information of the instrument terminal 10 depending on the performance operation of the performance section 18. Each time the performance information (MIDI message) is generated by the performance information generation section 112, the first performance data transmission section 113 transmits the performance data having the combination of the date/time information indicating the date/time being measured by the dock section 111, the performance information and the instrument ID to the server device 20. When the performance represented by the performance information generated by the performance information generating section 112 is carried out at the instrument terminal 10, the synchronization signal transmission section 114 generates a synchronization signal indicating a time code serving as the date/time being measured by the dock section 111 and the instrument ID, and transmits the generated synchronization signal to the moving image distribution server 40.

The first performance data receiving section 211 receives the performance data transmitted from the first performance data transmission section 113. The performance data received by the first performance data receiving section 211 is included in the performance data group 241. In parallel with the storage of the performance data in the storage section 24, the second performance data transmission section 212 transmits the performance data corresponding to the performance data request message received from the automatic performance piano 30 and serving as the performance data request message including the instrument ID and the date/time information among the performance data group 241 stored in the storage section 24 to the automatic performance piano 30. More specifically, the second performance data transmission section 212 transmits performance data including the instrument ID that is common to the performance data request message in the chronological order of the date/time starting from the date/time indicated by the date/time information included in the performance data request message.

The clock section 311 measures date/time as described above. The second performance data receiving section 312 receives the performance data transmitted through the second performance data transmission section 212 without passing through the moving image distribution server 40. The second performance data receiving section 312 requests the server device 20 to transmit the performance data corresponding to the date/time measured by the clock section 311 and receives the performance data transmitted according to the request. The buffering section 313 buffers the performance data received through the second performance data receiving section 312 in the buffer area thereof. The synchronization signal receiving section 314 receives the synchronization signal transmitted through the synchronization signal transmission section 114. The dock correction section 315 corrects the date/time measured by the dock section 311 on the basis of the time code obtained by decoding the synchronization signal. The dock correction section 315 corrects the date/time measured by the clock section 311 so that the date/time being coincident with the time code is measured, for example.

At the timing corresponding to the date/time indicated by the date/time information of the performance data received by the second performance data receiving section 312 and the date/time (in other words, the date/time measured by the dock section 311 after the correction) indicated by the synchronization signal received by the synchronization signal transmission section 314 and in synchronization with the video distributed at the time when the synchronization signal was distributed, the reproduction section 316 reproduces the MIDI message of the received performance data. For example, the reproduction section 316 alters the reproduction interval of the MIDI message from the length stipulated by the date/time information, changes the tempo at the time when the MIDI message is reproduced, or alters (skips) the MIDI message to be reproduced to provide interlocking so that a predetermined relationship is established between the date/time measured by the dock section 311 and the date/time indicated by the date/time information included in the performance data and to synchronize the distributed video with the performance sound. The reproduction section 316 herein obtains, from the buffering section 313, the MIDI message of the performance data including the date/time indicating the time before a predetermined time (herein, before 500 ms) from the/time measured by the dock section 311, and reproduces the MIDI message. A certain time is required after the MIDI message was supplied to the performance section 38 and until the respective sections of the performance section 38 operates as described above and the performance sound corresponding to the reproduction of the MIDI message is output (in other words, a delay occurs in the process at the performance section 38). Hence, the reproduction timing of each piece of the performance information in the reproduction section 316 is determined in anticipation of this delay in the process, whereby the live moving image is synchronized with the performance sound that is output by reproducing the MIDI message using the reproduction section 316. The reproduction timing may be determined in consideration of the delay in the process at the time when the PC 301 displays the live moving image, for example.

Operation of Embodiment

Figure 8:
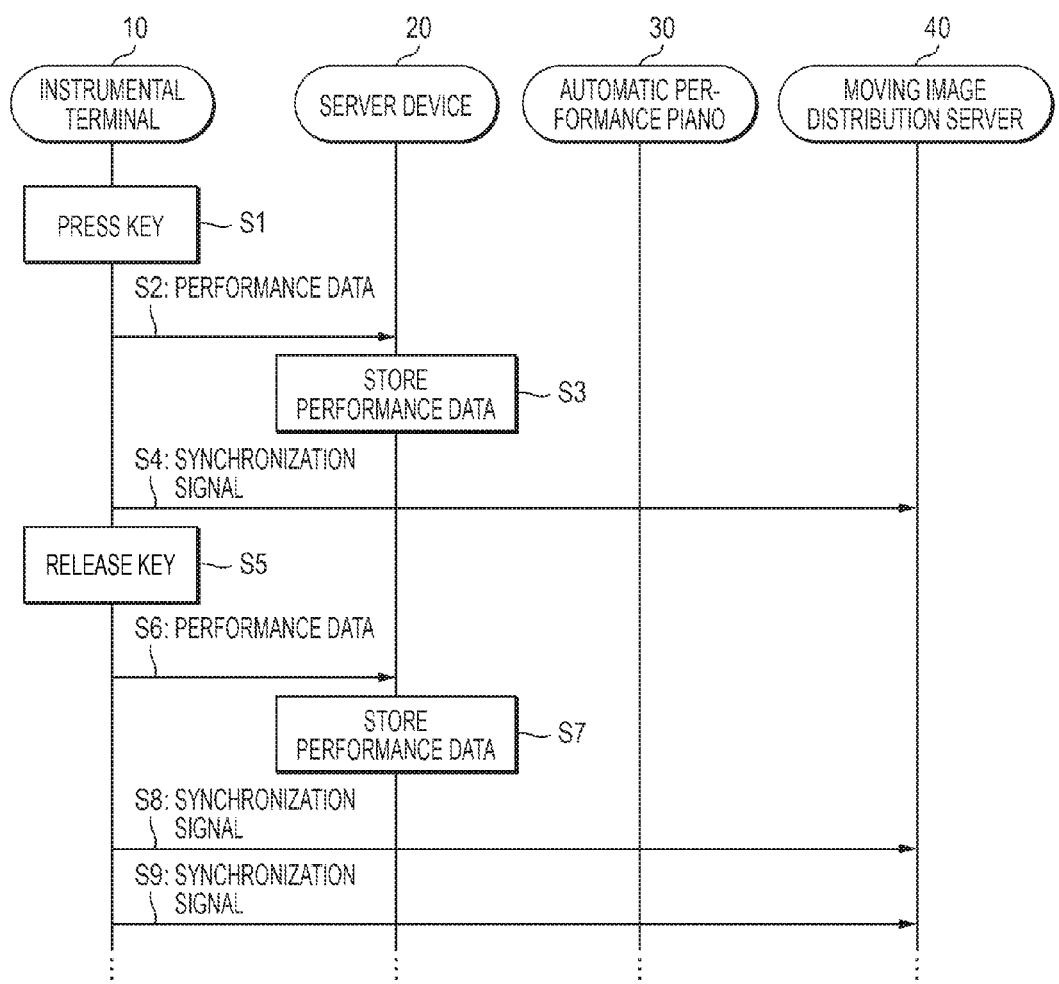
FIG. 8 is a sequence chart showing a procedure to be carried out by the performance system 100.
Figure 9:
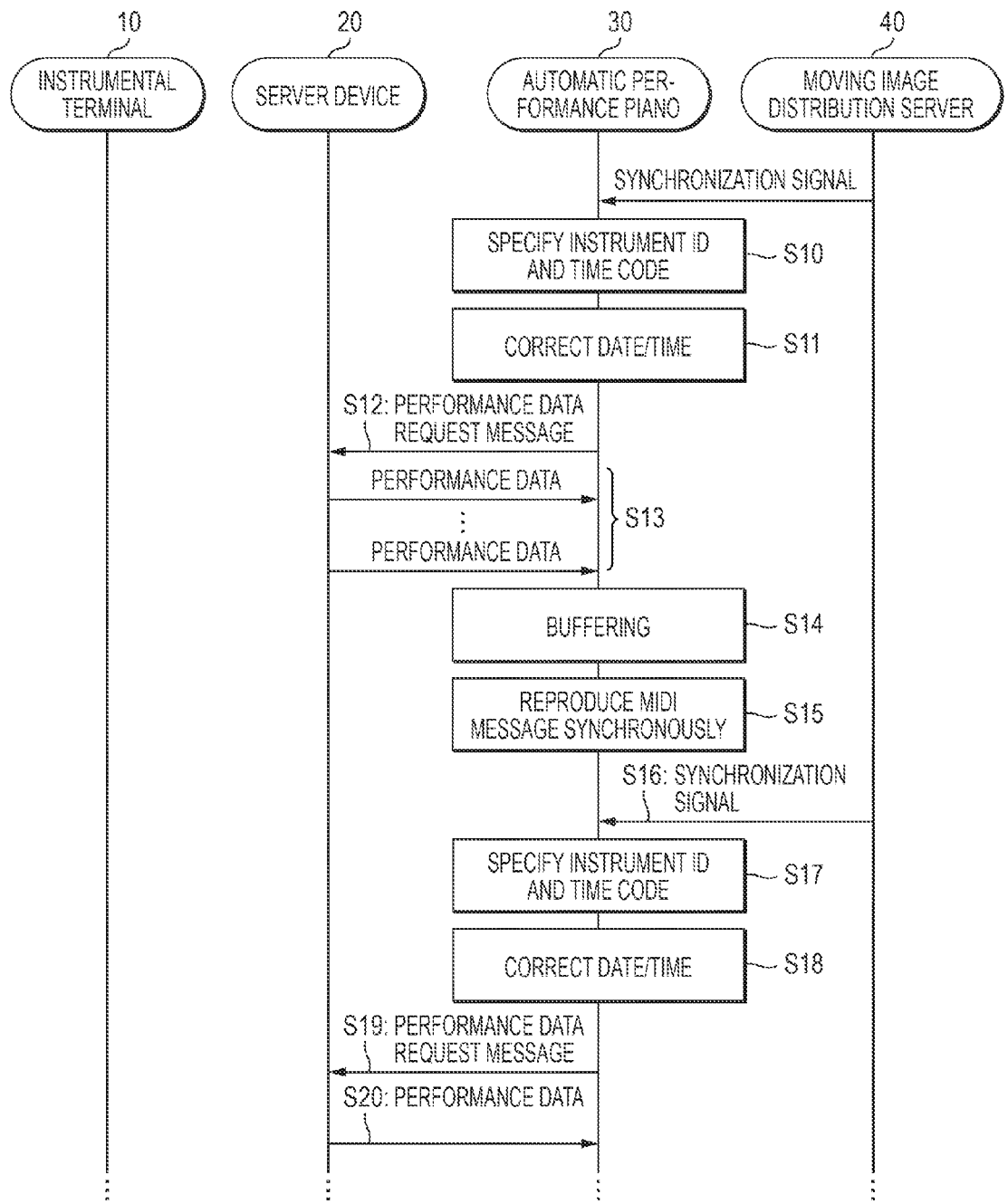
FIG. 9 is a sequence chart showing another procedure to be carried out by the performance system 100.

Next, the operation of the embodiment will be described. FIGS. 8 and 9 are sequence charts showing procedures to be carried out by the instrument terminal 10, the server device 20 and the automatic performance piano 30 during an automatic performance.

When the user turns on the power of the instrument terminal 10, the CPU executes the programs stored in the ROM of the control section 11. Then, the instrument terminal 10 can realize the functions of the electronic piano and can carry out communication with the communication network 90.

When the performer presses a key of the instrument terminal 10 (at step S1), the control section 11 generates a MIDI message including performance operation information, such as the note ON message, the note number corresponding to the pressed key, and the velocity corresponding to the operation on the key. Furthermore, by using the clock section 111, the control section 11 generates date/time information indicating the date/time when this note ON MIDI message is generated. The control section 11 generates performance data including the generated performance information, the generated date/time information and the instrument ID "0001" stored in the storage section 12, and transmits the performance data to the server device 20 through the communication section 17 (at step S2). It is herein assumed that the date/time measured by the control section 11 during the processing time at step S1 was "19 o'clock 00 minutes 00 seconds 00 on Dec. 28, 2010."

On the other hand, the control section 11 transmits the MIDI message to the musical sound generation section 13. When the MIDI message is supplied, the musical sound generation section 13 generates a musical sound signal corresponding to the note number and the velocity designated by the MIDI message, and supplies the generated signal to the speaker 14. When the signal supplied from the musical sound generation section 13 is supplied to the speaker 14, the musical sound corresponding to the supplied signal is delivered from the speaker 14.

Upon receiving the performance data transmitted from the instrument terminal 10 through the first communication section 22, the control section 21 of the server device 20 stores the received performance data in the storage section 24 (at step S3). The control section 21 herein stores the performance data having the combination of the date/time information "2010-12-28T19:00:00:00," the instrument ID "0001" and the performance information "MIDI message #1" in the storage section 24.

Next, the control section 11 of the instrument terminal 10 generates a synchronization signal by encoding the time code indicating the date/time measured by the clock section 111 and the instrument ID stored in the storage section 12, and transmits this synchronization signal to the HDD recorder 102 through the signal transmission section 19 (at step S4). The synchronization signal is transmitted from the HDD recorder 102 to the moving image distribution server 40 by the PC 104. In this embodiment, it is assumed that the control section 11 transmits the synchronization signal only once in one second on the basis of the date/time measured by the clock section 111.

The synchronization signal is subjected to the delay process carried out the delay device 103 and passes through the moving image distribution server 40. In this embodiment, the time when the synchronization signal generated at a certain time is received by the receiving-side system 3 is delayed approximately two minutes than the time when the performance data including the performance information generated at the same time is received by the server device 20.

Next, in the instrument ID, when the user releases his finger from the pressed key (at step S5), the control section 11 generates a MIDI message including performance operation information, such as the note OFF message, the note number corresponding to the released key, and the velocity corresponding to the operation on the key. Furthermore, by using the clock section 111, the control section 11 generates date/time information indicating the date/time when this note OFF MIDI message is generated. The control section 11 generates performance data including the generated MIDI message, the generated date/time information and the instrument ID "0001" stored in the storage section 12, and transmits the performance data through the communication section 17 (at step S6). Furthermore, the control section 11 transmits the MIDI message to the musical sound generation section 13. When the note OFF MIDI message is supplied, the musical sound generation section 13 stops the generation of the musical sound signal corresponding to the note number designated by the MIDI message. As a result, the output of the performance sound from the musical sound speaker 14 is stopped.

Upon receiving the performance data transmitted from the instrument terminal 10 through the first communication section 22, the control section 21 stores the received performance data in the storage section 24 (at step S7).

Herein, in the case that the date/time indicated by the date/time information is "19 o'clock 00 minutes 02 seconds 24 on Dec. 28, 2010," the control section 21 stores the performance data having the combination of the date/time information "2010-12-28T19:00:02:24" indicating the date/time, the instrument ID "0001" and "MIDI message #2" in the storage section 24.

The instrument terminal 10 hereafter generates performance information each time performance operation is carried out and transmits the performance data to the server device 20 through the communication section 17. In the server device 20, upon receiving the performance data from the instrument terminal 10 through the first communication section 22, the control section 21 stores the received performance data in the storage section 24. Moreover, the instrument terminal 10 repeats the process of transmitting the synchronization signal every second (at steps S8 and S9).

In parallel with the transmission and storage of the performance data described above, the following process relating to an automatic performance is carried out between the server device 20 and the automatic performance piano 30. As a result, it is assumed that such a performance data group as shown in FIG. 5 has been stored in the server device 20.

When the synchronization signal transmitted from the instrument terminal 10 is received by the PC 301, the control section 31 of the automatic performance piano 30 receives the synchronization signal through the signal receiving section 35. Next, the control section 31 decodes the received synchronization signal and specifies the instrument ID and the time code (at step S10). According to the instrument ID and the time code, it is possible to specify which instrument is used and at which date/time the live moving image to be output at the PC 301 is taken.

Upon receiving the synchronization signal, the control section 31 causes the storage section 32 to store the instrument ID indicated by the synchronization signal. While the instrument ID "0002" stored in the storage section 32 beforehand is held, the control section 31 herein causes the storage section 32 to store the instrument ID "0001" indicated by the synchronization signal, different from the above-mentioned instrument ID. The control section 31 hereafter obtains the performance data including the MIDI message to be reproduced from the server device 20 on the basis of the synchronization signal and according to the instrument ID stored in the storage section 32.

Next, the control section 31 corrects the date/time measured by the clock section 311 according to the time code specified by the process at step S10 (at step S11). The control section 31 herein corrects the date/time to the date/time that is common to the date/time indicated by the time code. As a result, the date/time measured by the dock section 311 becomes coincident with the date/time of the video being output at present at the PC 301.

Next, on the basis of the instrument ID and the time code specified by the process at step S11, the control section 31 transmits a performance data request message including the instrument ID and the date/time information (at step S12). The control section 31 herein designates the date/time indicated by the time code and the instrument ID stored in the storage section 32 and then transmits the performance data request message.

As described above, the HDD recorder 102 has the delay device 103, and the time code and the instrument ID are received by the PC 301 from the side of the instrument terminal 10 while being delayed approximately one minute. On the other hand, this delay is not generated intentionally in the transmission of the performance data from the instrument terminal 10 to the server device 20. It is assumed that the performance data that is requested by the automatic performance piano 30 so as to be transmitted has been stored securely in the server device 20.

Upon receiving the performance data request message through the second communication section 23, the control section 21 of the server device 20 transmits performance data including the instrument ID that is common to the performance data request message in the chronological order of the date/time starting from the performance data including the date/time information at the date/time designated by the transmission request message on the basis of the performance data group 241 stored in the storage section 24 (at step S13). In the case that the date/time designated by the performance data request message is "19 o'clock 00 minutes 00 seconds 00 on Dec. 28, 2010," the control section 21 first transmits performance data including date/time information "2010-12-28T19:00:00:00" as indicated in the first line of FIG. 5, and then transmits the performance data corresponding to "2010-12-28T19:00:02:24" and the performance data corresponding to "2010-12-28T19:00:03:59" sequentially.

As described above, once the automatic performance piano 30 has received one synchronization signal, the automatic performance piano receives plural pieces of performance data in chronological order sequentially. On the other hand, the control section 21 of the server device 20 keeps the performance data transmitted to the automatic performance piano 30 and the performance data including the date/time information of the past in the storage section 24. Hence, even after a certain time has passed from the time when a performance was carried out using the instrument terminal 10, the automatic performance piano 30 can obtain the performance data and reproduce the performance information. In addition, this accumulation of the performance data can reduce the storage capacity of the buffer area in the data buffer 37 of the automatic performance piano 30.

Upon receiving the performance data through the communication section 36, the control section 31 of the automatic performance piano 30 buffers the performance data in the data buffer 37 sequentially (at step S14). At this time, in the case that the reception and buffering of the performance data is stopped temporarily, for example, in the case that a buffering amount relative to the storage capacity of the data buffer 37 has become equal to or more than a threshold value, the control section 31 may request the server device 20 to stop the buffering so that the performance data is prevented from vanishing.

Next, the control section 31 supplies the MIDI message to the performance section 38 at the timing corresponding to the date/time indicated by the date/time information of the performance data received through the communication section 36 and the date/time measured by the dock section 311 (in other words, the date/time indicated by the received synchronization signal) and reproduces the MIDI message (at step S15). The control section 31 herein reproduces the MIDI message that is combined with the date/time information obtained 500 ms before the date/time measured by the clock section 311. In other words, when the date/time measured by the clock section 311 become 500 ms before the date/time indicated by the date/time information that is combined with the MIDI message, the MIDI message is reproduced. In this way, when the video at the distribution time of the synchronization signal used for the correction of the clock section 311 is output, the control section 31 adjusts the reproduction timing of the MIDI message using the time indicated by the synchronization signal, thereby realizing synchronized reproduction (automatic performance).

The control section 31 erases the reproduced performance data from the data buffer 37, thereby ensuring the storage capacity thereof.

The control section 31 hereafter continuously reads the MIDI data from the data buffer 37 in chronological order and carries out reproduction. Since the control section 31 reproduces the MIDI message of each piece of the performance data according to the date/time measured by the clock section 311 even during a period in which no synchronization signal is received, the live moving image is synchronized with the automatic performance at this time.

Then, the control section 31 of the automatic performance piano 30 receives the synchronization signal from the moving image distribution server 40 (at step S16). Also in this case, the control section 31 decodes the received synchronization signal and specifies both the instrument ID and the time code (at step S17). Next, the control section 31 corrects the date/time measured by the clock section 311 according to the time code specified by the process at step S15 (at step S18). And then, the control section 31 reproduces the MIDI message at the timing synchronized with the video and audio output from the PC 301 by following the above-mentioned procedure.

Then, for example, in the case that the storage capacity of the data buffer 37 becomes equal to or less than the threshold value, the control section 31 transmits the performance data request message again to the server device 20 (at step S19). Then, the control section 31 buffers the performance data received according to the performance data request message in the data buffer 37 (at step S20) and continues the automatic performance on the basis of the MIDI message by following the above-mentioned procedure.

The above-mentioned operation continues after the performance at the instrument terminal 10 was ended and until the automatic performance at the automatic performance piano 30 is ended.

In the performance system 100 according to the embodiment described above, the automatic performance can be carried out in synchronization with the video while suppressing the influence of the state of the video transmission path. More specifically, the synchronization signal passes through the moving image distribution server 40, but the performance data does not pass therethrough. For this reason, even in the case that the distribution of the synchronization signal, the video signal and the audio signal is delayed due to too much access to the moving image distribution server 40, due to occurrence of system down for any cause, or due to the state of communication, the automatic performance piano 30 can carry out an automatic performance by using the performance data received through a path different from this path. Moreover, even if the live moving image is interrupted temporarily, the user of the automatic performance piano 30 does not have any uncomfortable feeling caused due to the interruption of the performance sound thereof for the reason that the automatic performance of the automatic performance piano 30 continues. What's more, since the date/time is specified according to the time code in the automatic performance piano 30, even if the distribution of each signal of the moving image distribution server 40 is interrupted and then restored, the automatic performance can be started from the timing after the restoration.

Furthermore, in this embodiment, since the respective sections of the performance section 38, such as the keys, are operated in synchronization with the video and the operation of the instrument terminal 10 is reproduced, the user of the automatic performance piano 30 can experience the realistic sensation of a concert hall at a distant place.

Still further, even In the case that the transmitting-side systems 1 are provided at a plurality of halls simultaneously and live performances are carried out, the present invention is applicable. In this case, the moving image distribution server 40 may simply be allocated to each transmitting-side system 1 (concert hall) for each channel. In other words, the synchronization signal corresponding to the channel set at the PC 301 at present is received by the automatic performance piano 30.

After channel switching, the automatic performance piano 30 can specify the instrument ID and the date/time information on the basis of the received synchronization signal and can carry out an automatic performance.

Other Embodiments

The present invention is not limited to the above-mentioned embodiment but can be modified variously. Some of modification examples will be described hereafter. Among the following modification examples, two or more thereof may be used in combination.

Modification Example 1

Figure 10:
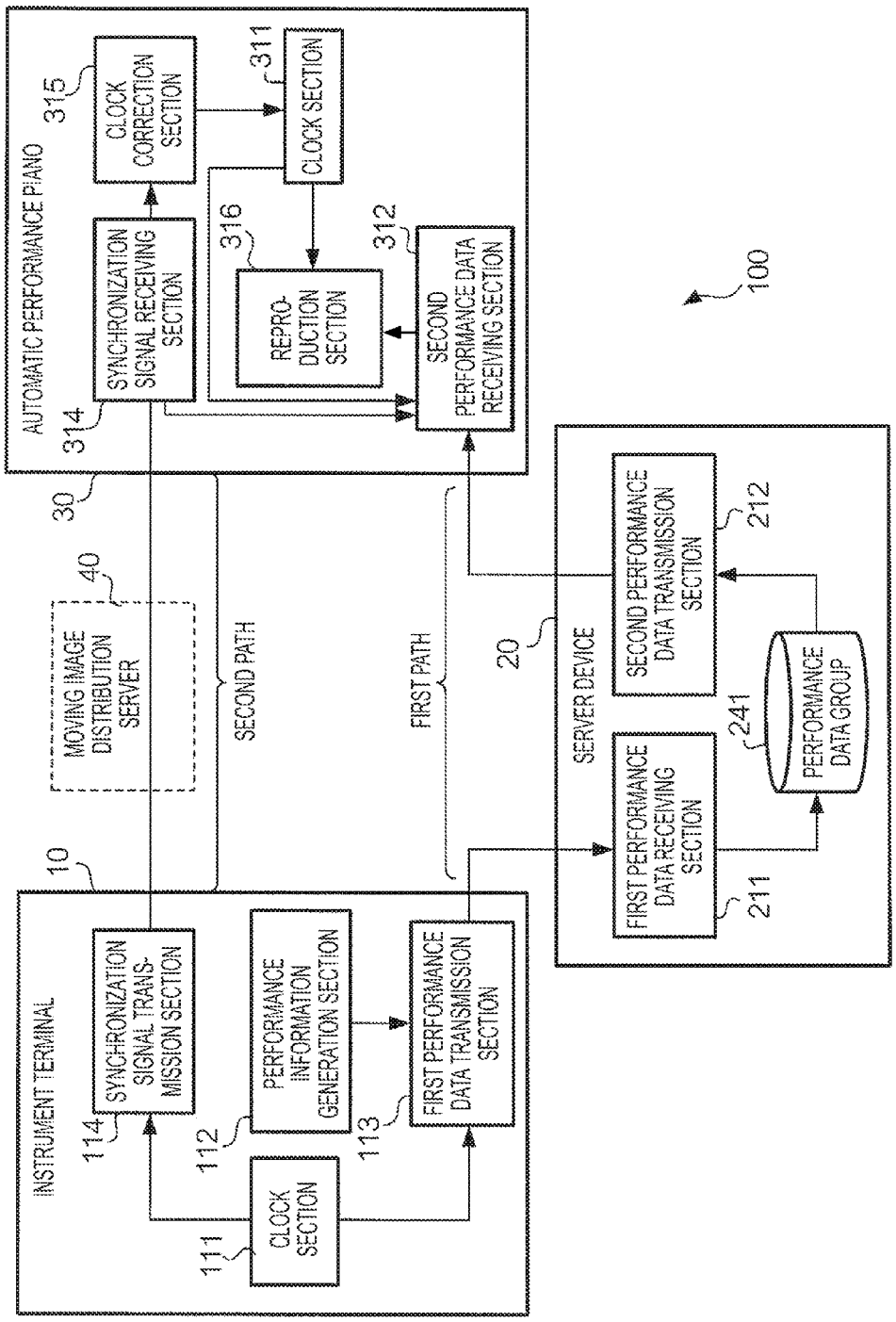
FIG. 10 is a function block diagram showing a functional configuration of the performance system 100.

In the above-mentioned embodiment, upon receiving the synchronization signal, the automatic performance piano 30 transmits a performance data request message to the server device 20 and receives the performance data to be buffered in the data buffer 37. Instead of this configuration, the automatic performance piano 30 may have a configuration not having the data buffer 37. FIG. 10 is a block diagram showing a functional configuration of the performance system 100 according to this modification example. Among these functions, the same functions as those of the above-mentioned embodiment are designated by the same reference codes, and their descriptions are omitted. As shown in FIG. 10, in this modification example, the buffering section 313 is not realized in the automatic performance piano 30.

In the case that a highly reliable communication path is used for the connection between the automatic performance piano 30 and the server device 20, for example, in the case that the connection therebetween is made via a communication path capable of providing high-speed data communication, it is possible to specify accurately, to some extent, the total time of the communication delay between the automatic performance piano 30 and the server device 20 and the time required for the performance section 38 to output performance sound after performance information was supplied thereto. Hence, the control section 31 transmits a performance data request message to the server device 20 so as to receive the performance data including the information of the date/time before approximately the total time from the date/time measured by the clock section 311. Furthermore, upon receiving the performance data, the control section 31 stores the performance data in the RAM and reads and reproduces the MIDI message included in the performance data at the timing in synchronization with the video distributed by the moving image distribution server 40.

In this modification example, the storage section 24 of the server device 20 can have a function equivalent to that of the data buffer 37, whereby the configuration of the automatic performance piano 30 can be simplified.

Modification Example 2

The control section 31 of the automatic performance piano 30 receives the synchronization signal through the communication section 36 in a predetermined cycle (herein, one second). In this case, if the control section 31 has not received the synchronization signal for a predetermined period (for example, one minute) longer than this reception cycle, the control section 31 continuously reproduces the MIDI message; however, if the synchronization signal has not been received beyond this predetermined period, the control section 31 may stop the reproduction of the MIDI message.

For example, if an accident has occurred in the moving image distribution server 40, a state continues in which the automatic performance piano 30 can receive the performance data but cannot receive the synchronization signal. At this time, since the automatic performance piano 30 can receive the performance data even after the accident has occurred, the automatic performance piano 30 can continue its automatic performance. For this reason, with the performance system 100, the user does not have an uncomfortable feeling that is caused due to sudden stop of the automatic performance. On the other hand, if the synchronization signal is not received for a certain time or more, the timing of the video distributed by the moving image distribution server 40 is significantly displaced from the timing of the automatic performance, whereby an undesirable situation may occur. For this reason, if the control section 31 cannot receive the synchronization signal for a certain period and if the period extends beyond the period in which no problem occurs even if the synchronization signal is not received, the control section 31 stops the supply of the performance information to the performance section 38, thereby discontinuing the automatic performance.

In this modification example, the automatic performance piano 30 may resume the automatic performance when the reception of the synchronization signal is resumed.

Modification Example 3

The above-mentioned embodiment is based on the assumption that an automatic performance in synchronization with a live moving image taken from a live performance is realized; however, the present invention is also applicable to a performance system in which recorded video is used instead of the live moving image. In this case, the server device 20 accumulates performance data when the performance is recorded. When the automatic performance is realized, the server device 20 transmits the accumulated video signal and audio signal and the synchronization signal to the moving image distribution server 40. Then, the moving image distribution server 40 distributes the video signal, the audio signal and the synchronization signal. Furthermore, the recording of these signals may be carried out using the HDD recorder 102. On the other hand, the receiving-side system 3 carries out an automatic performance on the basis of the respective signals received from the moving image distribution server 40 by following a procedure similar to those of the above-mentioned embodiment.

In the configuration of this modification example, the server device 20 may file and record the received performance data. The reason for this is that when one instrument terminal 10 carried out a plurality of performances, for example, there is a case in which performances desired to be carried out automatically are desired to be distinguished. Furthermore, in the server device 20, it is considered desirable that performance data is merged with respect to concert or music in the management of the performance data. In this filing, plural pieces of performance information may be merged and filed manually with respect to concert or music, but it is preferable that the filing can be realized without manual operation. In this case, the server device 20 is desired to perform the filing by following the procedure described below. In this configuration, it is assumed that the server device 20 has a clock section for measuring date/time.

While the instrument terminal 10 carries out a performance, the control section 21 of the server device 20 receives the performance data thereof through the first communication section 22 and stores the data in the RAM. When the performance at the instrument terminal 10 is ended with time, the performance data is not transmitted from the instrument terminal 10 to the server device 20. When the performance data is not transmitted from the instrument terminal 10, in the server device 20, the difference between the date/time measured by the clock section thereof and the date/time indicated by the date/time information of the performance data received last becomes larger gradually. Hence, when the difference between the date/time measured by the clock section thereof and the date/time indicated by the date/time information of the performance data received last becomes equal to or more than a threshold value (herein, 5 seconds), the control section 21 judges that the performance at the instrument terminal 10 specified by the instrument ID "0001" has been ended. In this case, the control section 21 files the performance data stored in the RAM and then carries out a process for storing the data in the storage section 24. More specifically, the control section 21 generates a performance file obtained by merging all the performance data including the instrument ID "0001" stored in the RAM among the performance data stored in the RAM into a single file. Furthermore, the control section 21 generates a performance file identifier for uniquely identifying the performance file and stores the performance file including the performance file identifier in the storage section 24. It may be said that the file identifier is an identifier to be allocated to a performance information group serving as a group of performance information classified with respect to concert or music, for example.

Moreover, it may be possible that the control section 21 obtains the instrument ID included in the performance data of the performance file, also obtains the performance starting date/time indicated by the earliest date/time information and the performance ending date/time indicated by the latest date/time information among the date/time values included in the performance data in the performance file, and then stores these while these are made to correspond to one another.

FIG. 11 is a view showing a structure of a performance table in which a group of an instrument ID, a performance starting date/time, a performance ending date/time and a performance file identifier is described. The storage section 24 stores this performance table. For example, in the case that the earliest date/time information included in the performance data in the performance file is "2010-12-28T19:00:00:00," the date/time information included in the performance data transmitted from the instrument terminal 10 at the end of the performance is "2010-12-28T19:31:23:05," the instrument ID is "0001" and "F0001" is generated as a file identifier, these pieces of information are stored in the same line of the performance table as shown in FIG. 11. When the user turns on the instrument terminal 10 and then carries out a performance using the instrument terminal 10, the performance file including the MIDI message representing the performance carried out by the user is stored in the server device 20 as described above, without any need for the user to carry out button operation for starting and ending the recording of the performance. The above-mentioned operation is carried out each time the user carries out a performance, and in the server device 20, a performance file is stored for each performance carried out by the user.

In addition, in this modification example, it is desirable that the automatic performance piano 30 should specify the performance data to be received from the server device 20 by using the file identifier. Hence, the instrument terminal 10 generates a synchronization signal by using the file identifier instead of the instrument ID or by using the file identifier together with the instrument ID and then transmits the synchronization signal. On the other hand, it is desirable that the automatic performance piano 30 should receive only the performance data including the file identifier indicated by the synchronization signal and should not receive the performance data not including the file identifier indicated by the synchronization signal.

In a mode in which recorded video is distributed as in this modification example, even in the case that video skipping, fast-forwarding or rewinding is carried out and the reproduction position of a moving image is altered, the signal to be distributed from the moving image distribution server 40 is adapted so as to correspond to the altered reproduction position, whereby the automatic performance piano 30 can realize an automatic performance in synchronization with the moving image.

Modification Example 4

Although the audio signal and the synchronization signal are transmitted through the separate channels of the audio signal transmission path in the above-mentioned embodiment, it may be possible that the synchronization signal is superimposed on (in other words, synthesized with) the audio signal by using the so-called watermarking technology and then transmitted.

Figure 12:
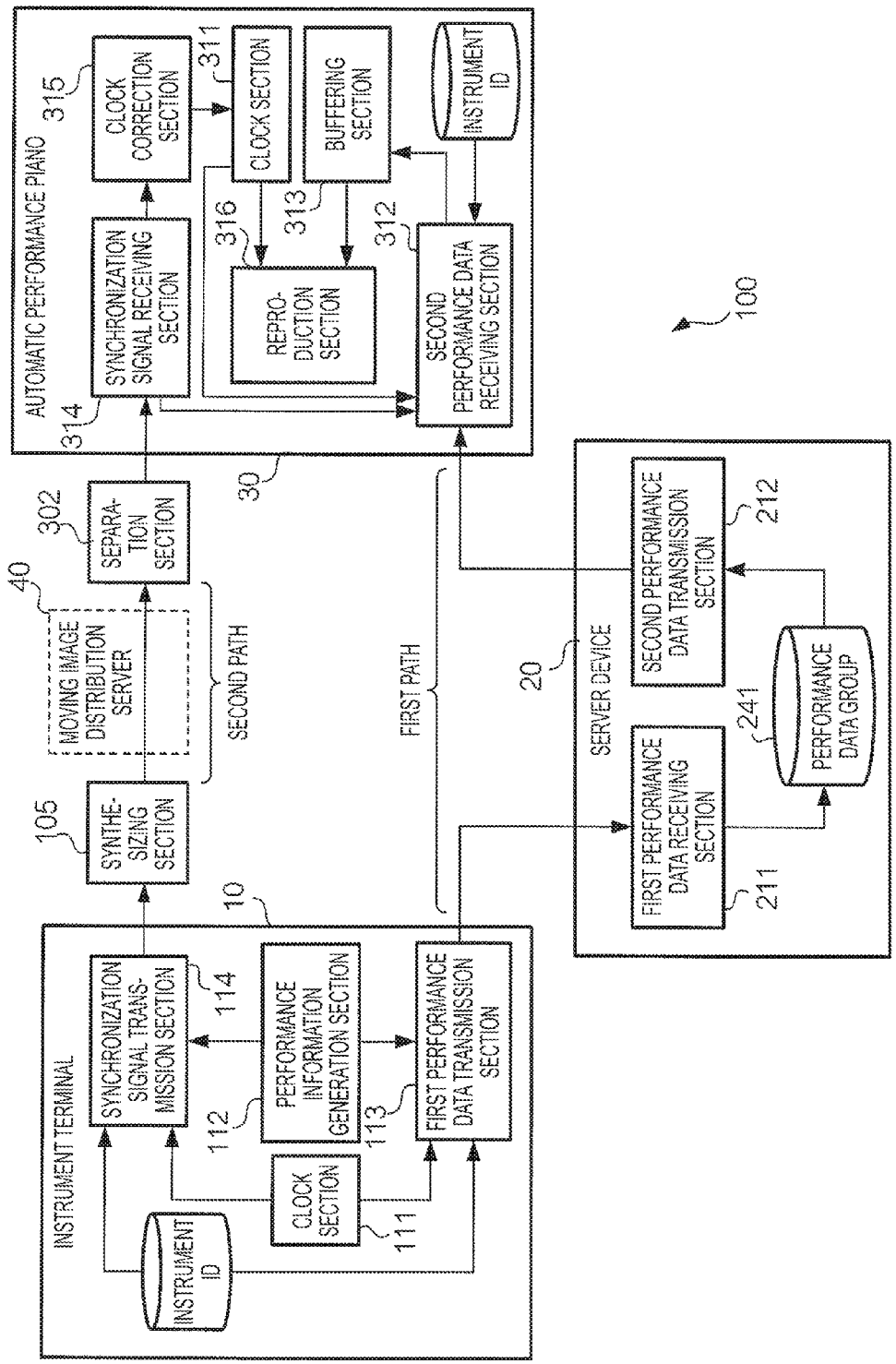
FIG. 12 is a function block diagram showing another functional configuration of the performance system 100.

FIG. 12 is a block diagram showing a functional configuration of the performance system 100 according to this modification example. Among these functions, the same functions as those of the above-mentioned embodiment are designated by the same reference codes, and their descriptions are omitted. As shown in FIG. 12, in this modification example, a synthesizing section 105 is provided on the side of the transmitting-side system 1 and outside the instrument terminal 10. Furthermore, a separation section 302 is provided on the receiving-side system 3 and outside the automatic performance piano 30.

The synthesizing section 105, for example, phase-modulates a carrier signal representing a carrier for carrying an audio signal on the basis of watermark information, thereby synthesizing the watermark information in a band higher than the frequency components of the audio signal. Furthermore, it may be possible that the synthesizing section 105 synthesizes the watermark information with the audio signal by carrying out the so-called OFDM (Orthogonal Frequency-Division Multiplexing) modulation. The separation section 302 separates the audio signal from the synchronization signal by using a method corresponding to the method for synthesizing the synchronization signal in the synthesizing section 105. Furthermore, the synthesizing and separation may be carried out by using the following procedure.

Figure 13:
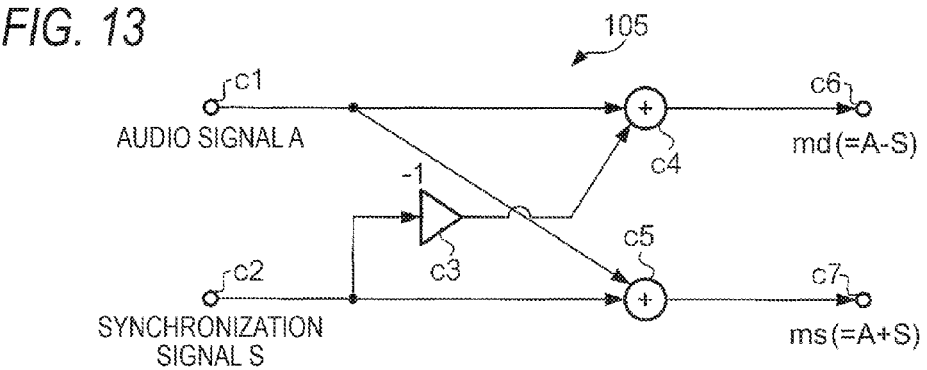
FIG. 13 is a view showing a circuit configuration of a synthesizing section 105.

FIG. 13 is a view showing a circuit configuration of the synthesizing section 105 for synthesizing the synchronization signal S with the audio signal A. In the following description, the signal obtained by inverting the phase of the audio signal A is represented by "audio signal—A" and the signal obtained by inverting the phase of the synchronization signal S is represented by "synchronization signal—S."

The synthesizing section 105 has input terminals c1 and c2. The input terminal c1 is a terminal to which the audio signal A is input. The input terminal c2 is a terminal to which the synchronization signal S is input. An inversion section c3 inverts the phase of a signal input thereto and outputs the inverted signal. The inversion section c3 herein inverts the phase of the synchronization signal S input to the input terminal c2 and outputs the synchronization signal—S. Each of addition sections c4 and c5 is used to add signals input thereto and to output the obtained signal. The addition section c4 adds the audio signal A input to the input terminal c1 to the synchronization signal—S output from the inversion section c3 and outputs the result of the addition as a first difference signal md (=A−S) to an output terminal c6. In other words, the inversion section c3 and the addition section c4 are used to generate a difference signal representing the difference between the audio signal and the synchronization signal. The addition section c5 adds the audio signal A input to the input terminal c1 to the synchronization signal S input to the input terminal c2 and outputs the result of the addition as a first sum signal ms (=A+S) to an output terminal c7. The addition section c5 generates a sum signal representing the sum of the audio signal and the synchronization signal.

The output terminal c6 corresponds to one channel (herein, the L channel) and outputs the first difference signal md. The output terminal c7 corresponds to the other channel (herein, the R channel) and outputs the first sum signal ms. The PC 104 transmits the two-channel signals encoded as described above to the moving image distribution server 40 via the audio signal transmission path.

Figure 14:
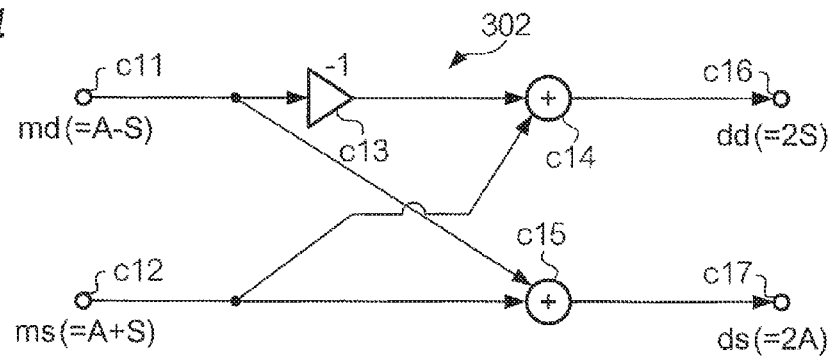
FIG. 14 is a view showing a circuit configuration of a separation section 302.

FIG. 14 is a view showing a circuit configuration of the separation section 302 for separating the synchronization signal S from the audio signal A. In the following description, the signal obtained by inverting the phase of the first difference signal md is represented by "first difference signal—md" and the signal obtained by inverting the phase of the first sum signal ms is represented by "first sum signal—ms." Furthermore, each of the integers ahead of the signals "A" and "S" means that each of the amplitudes of the signals "A" and "S" is multiplied by the integer.

An input terminal c11 corresponds to the L channel and is a terminal to which the first difference signal md (=A−S) is input. An input terminal c12 corresponds to the R channel and is a terminal to which the first sum signal ms (=A+S) is input. An inversion section c13 inverts the phase of a signal input thereto and outputs the inverted signal. The inversion section c13 herein inverts the phase of the first difference signal md input to the input terminal c11 and outputs the inverted signal. In other words, when the first difference signal md (=A−S) is input, the inversion section c13 outputs a first difference signal −md (=−A+S), that is, the opposite-phase signal thereof. Each of addition sections c14 and c15 is used to add signals input thereto and to output the obtained signal. The addition section c14 adds the first difference signal −md (=−A+S) output from the inversion section c13 to the first sum signal ms=A+S input to the input terminal c12 and outputs the result of the addition as a second difference signal dd (=2S) to an output terminal c16. In other words, the inversion section c13 and the addition section c14 are used to generate a difference signal representing the difference obtained when the first difference signal is subtracted from the first sum signal. The addition section c15 adds the first difference signal and (=A−S) input to the input terminal c11 to the first sum signal ms (=A+S) input to the input terminal c12 and outputs the result of the addition as a second sum signal ds (=2A) to an output terminal c17. In other words, the addition section c15 is used to generate a sum signal representing the sum of the first difference signal and the first sum signal.

The output terminal c16 outputs the second difference signal dd as the synchronization signal. The output terminal c17 outputs the second sum signal ds as the audio signal. The PC 301 outputs audio corresponding to the audio signal A separated as described above and transmits the synchronization signal S to the automatic performance piano 30.

In the case that the amplitudes of the second difference signal dd and the second sum signal ds are changed to the original amplitudes (in other words, ½), the audio signal A and the synchronization signal S, i.e., the original information before the encoding, can be specified (in other words, decoded).

With this configuration, even in the case that the audio signal transmission path passing through the moving image distribution server 40 has two channels, a stereo audio signal can be transmitted from the transmitting-side system 1 to the receiving-side system 3. Furthermore, even in the case that at least a part of the frequency components of the synchronization signal S is included in the same band as that of the frequency components of the audio signal A, encoding and decoding can be made by the addition and subtraction of both the signals, whereby the quality of the musical sound signal can be suppressed from deteriorating.

In the case that the above-mentioned synthesis of the watermark information is carried out, it is preferable that in the performance system 100, the PCM (Pulse Code Modulation) system, for example, should be adopted, and that the respective signals should be transmitted while the sampling frequency thereof is raised.

In addition, in the configuration of the above-mentioned embodiment, in the case that a stereo audio signal is desired to be transmitted, an audio signal transmission path with three or more channels may be provided in the communication paths passing through the moving image distribution server 40.

Modification Example 5

Although the PC 104 and the PC 301 are used to transmit and receive the synchronization signal in the above-mentioned embodiment, the instrument terminal 10, instead of the PC 104, may be connected to the communication network 90 and may transmit the synchronization signal. Furthermore, the automatic performance piano 30, instead of the PC 301, may be connected to the communication network 90 and may transmit the synchronization signal.

Moreover, the server device 20 and the instrument terminal 10 may be provided at the same place, and these may be connected via a communication path, such as a LAN (Local Area Network), instead of being connected via the communication network 90.

What's more, although both the communication path for the synchronization signal, the video signal and the audio signal and the communication path for the performance data include the communication network 90, the communication paths may be configured so as to pass through communication networks being independent of each other.

Besides, the moving image distribution server 40 is not limited to a device that can be used by an unspecified large number of users but may be provided exclusively for the performance system 100.

In addition, in the above-mentioned embodiment, the HDD recorder 102 has the delay device 103. Instead of this configuration, it may be possible that the HDD recorder 102 does not have the delay device 103 and that the delay process function of the moving image distribution server 40 is used to delay the distribution timing of the video signal, the audio signal and the synchronization signal.

Modification Example 6

In the above-mentioned embodiment, it is possible to omit the instrument ID. For example, in the case that the server device 20 stores performance data including the performance information generated by a single musical instrument (for example, in the case that one instrument terminal 10 is used), the automatic performance piano 30 can realize an automatic performance according to only the time code even if no instrument ID is available.

Besides, the dock section 311 may measure the time elapsed from the start time of an automatic performance, for example. Even in this case, the dock correction section 315 corrects the date/time measured by the dock section 311 depending on the date/time indicated by the time code, whereby synchronized reproduction equivalent to that in the embodiment can be realized.

In addition, the instrument terminal 10 may transmit only the time information, instead of the date/time information including the date information and the time information, while the time information is included in the performance data, or the time thereof may be included in the time code. In this case, a configuration is obtained in which the "date/time information" in the above-mentioned embodiment is replaced with "time information"; however, in the case that a live performance is used for an automatic performance, the automatic performance can be realized, provided that only the time of performance operation is known on the side of the receiving-side system 3, even if the data cannot be specified.

Figure 15:
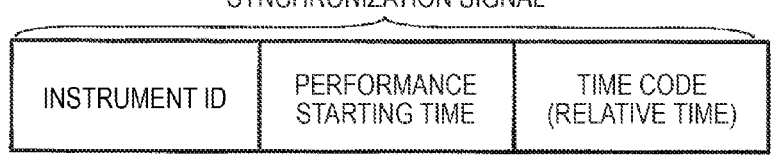
FIG. 15 is a view showing a data structure of a synchronization signal.

Furthermore, although the synchronization signal is used to indicate an instrument ID and date/time information indicating the date/time when a performance was carried out in the above-mentioned embodiment, the synchronization signal may indicate information other than these. For example, as shown in FIG. 15, the synchronization signal may indicate an instrument ID, performance start time, that is, the time when a performance was carried out at the instrument terminal 10, and a time code indicating the time elapsed from the performance start time (that is, relative time). The performance start time represents "19 o'clock 00 minutes 00 seconds 00 on Dec. 28, 2010" in the case of the embodiment. Moreover, the time code is described as follows when the example shown in FIG. 5 is used. The time code represents "0 hours 0 minutes 00 seconds 00" in the performance data corresponding to the first line, represents "0 hours 0 minutes 02 seconds 24" in the performance data corresponding to the second line, and represents "0 hours 0 minutes 03 seconds 59" in the performance data corresponding to the third line.

The performance start time is included in all the synchronization signals to be transmitted from the instrument terminal 10; however, in the case that the automatic performance piano 30 can specify the performance start time, for example, in the case that the performance to be reproduced by the automatic performance piano 30 is unchanged, the performance start time may be included only in the first synchronization signal to be transmitted from the instrument terminal 10. In this case, during the performance at the instrument terminal 10, the automatic performance piano 30 specifies the performance start time on the basis of the performance start time indicated by the synchronization signal received at first.

In the case that the reproduction timing of the MIDI message is adjusted so that the time indicated by the time information of the performance data is interlocked with the time indicated by the received synchronization signal as described above, the automatic performance piano 30 can realize an automatic performance.

Modification Example 7

Furthermore, an automatic performance may be carried out at the automatic performance piano 30 such that the pitch thereof is made coincident with that of the instrument terminal 10. The method for this is also disclosed in Japanese Patent No. 3867579.

More specifically, the instrument terminal 10 detects the reference pitch thereof and transmits a signal indicating this reference pitch to the automatic performance piano 30 by using the same method as that used for transmitting the synchronization signal, for example. The reference pitch is a frequency obtained when a sound with a certain musical pitch is output from the performance section 18, and this frequency represents a pitch that is used as the reference in the performance system 100. However, the method for transmitting the signal indicating the reference pitch is not specified particularly.

Upon obtaining the reference pitch, the automatic performance piano 30 detects the reference pitch of the performance section 38 thereof and obtains the difference between the musical pitches. Furthermore, during an automatic performance, the automatic performance piano 30 reads the performance data from the data buffer 37 at a reading speed corresponding to the difference between the musical pitches and reproduces the performance data so that the frequency of the sound with the musical pitch becomes close to (preferably coincident with) the reference pitch.

With the configuration of the modification example, the reference pitch of the instrument terminal 10 can be made close to that of the automatic performance piano 30, and the influence due to the individual difference, etc. in the automatic performance piano 30, can be suppressed, whereby an automatic performance can be expected to be realized at musical pitches closer to those in a live performance.

Modification Example 8

In the above-mentioned performance system 100, it may be possible to charge money for a part or all of the service. For example, it is assumed that the server device 20 carries out this charging process and that the automatic performance piano 30 to which the performance data is transmitted is registered beforehand. Furthermore, the server device 20 checks the automatic performance piano 30 for authentication before the start of an automatic performance and permits the transmission of the performance data if the authentication is successful. Moreover, when it is desired to restrict the users who are permitted to use the service relating to the automatic performance, it may be possible that the automatic performance piano 30 to which the performance data is to be transmitted is registered beforehand by the server device 20, and that the server device 20 checks the automatic performance piano 30 for authentication before the start of the automatic performance and permits the automatic performance if the authentication is successful.

Modification Example 9

In the above-mentioned embodiment, the case in which the performance information output device according to the present invention is the instrument terminal 10, more particularly, an electronic piano, has been described; however, the device may be an automatic performance piano capable of outputting, for example, a MIDI message, corresponding to performance operation. In this case, automatic performance pianos of the same type can be used as the instrument terminal 10 and the automatic performance piano 30. Furthermore, the performance information output device according to the present invention may be an instrument terminal other than a piano, for example, a keyboard instrument, such as an Electone (registered trade name) or an organ, or a wind instrument, such as a flute or a clarinet, or a percussion instrument, such as a drum. Hence, the automatic performance device according to the present invention is not limited to an automatic performance piano, but may be a device capable of carrying out an automatic performance on the basis of a MIDI message.

Moreover, the performance information output device and the automatic performance device according to the present invention may be, for example, an information terminal, such as a smart phone, a slate terminal or a smart book, in which an application program for instrument performances has been installed, or a mobile music player, or a device having no manual performance function.

The performance information according to the present invention is not limited to that conforming to the MIDI format, but may be information representing the contents of a performance at the instrument terminal 10 and capable of being used for an automatic performance.

Modification Example 10

Programs to be executed by the control section 11 of the instrument terminal 10, the control section 21 of the server device 20 and the control section 31 of the automatic performance piano 30 according to the embodiment described above can be provided in a state of being recorded on computer-readable recording media, such as magnetic recording media (magnetic tape, magnetic disks (HDD and FD), etc.), optical recording media (optical disks (CD and DVD), etc.), magneto-optical recording media, and semiconductor memory. In addition, the programs can be downloaded via a network, such as the Internet. Furthermore, the functions to be realized by the control section 11, the control section 21 and the control section 31 may be realized by a single or a plurality of software products or may be realized by a single or a plurality of hardware products.

The invention claimed is:

1. An automatic performance device for reproducing performance information received from a performance information output device in synchronization with video distributed by a moving image distribution server for distributing the video and an audio, the automatic performance device comprising:
    a performance data receiving unit that receives performance data transmitted from a storage device without passing through the moving image distribution server, the storage device configured to store the performance data having a combination of the performance information and the time information, the performance information being output from the performance information, the time information indicating the time when the performance indicated by the performance information was carried out, and the time being measured by the clock section of the performance information output device;
    a synchronization signal receiving unit that receives a synchronization signal transmitted from the performance information output device by using an audio signal transmission path for the audio via the moving image distribution server, the synchronization signal indicating the time measured by the clock section; and
    a reproducing unit that reproduces the performance information of the performance data in synchronization with the video distributed at the time when the synchronization signal is distributed, at the timing corresponding to the time indicated by the time information of the performance data received by the performance data receiving unit and the time indicated by the synchronization signal received by the synchronization signal receiving unit.

2. The automatic performance device according to claim 1, further comprising:
a buffering unit configured to buffer the performance data received by the performance data receiving unit in a buffering area,
wherein the reproducing unit reads the performance information of the buffered performance data from the buffering area and reproduces the performance information in parallel with the buffering by the buffering unit.

3. The automatic performance device according to claim 1, wherein while the reproducing unit reproduces the performance information, the synchronization signal receiving unit receives the synchronization signal in a predetermined cycle; and
wherein if the synchronization signal has not been received within a predetermined period longer than the cycle, the reproducing unit continuously reproduces the performance information, and if the synchronization signal has not been received beyond the period, the reproduction of the performance information is stopped.

4. The automatic performance device according to claim 1, wherein in addition to the performance information and the time information, the storage device stores an identifier for identifying the performance information output device or a performance information group serving as a group of the performance information;
wherein the synchronization signal is a signal indicating the identifier and the time when the performance was carried out; and
wherein the reproducing unit reproduces the performance information of the performance data including the identifier indicated by the synchronization signal, and does not reproduce the performance information of the performance data including the other identifiers.

5. A storage device being capable of communicating with a performance information output device for outputting performance information and an automatic performance device for reproduction the performance information in synchronization with a video distributed by a moving image distribution server for distributing the video and an audio, the storage device comprising:
a performance data receiving unit that receives performance data having a combination of the performance information and the time information from the performance information output device each time the performance information is generated by the performance information output device without passing through the moving image distribution server, the time information indicating the time when the performance indicated by the performance information was carried out,
a storing unit that stores the performance data received by the performance data receiving unit; and
a performance data transmitting unit that transmits the performance data stored in the storing unit to the automatic performance device without passing through the moving image distribution server in parallel with the storing of the performance data received by the storing unit.

6. A performance information output device being capable of communicating with a storage device and an automatic performance device for reproducing performance information in synchronization with a video distributed by a moving image distribution server for distributing the video and an audio, the performance information output device comprising:
a performance information generating unit that generates performance information;
a clocking unit that measures time;
a performance data transmitting unit that transmits performance data having a combination of time information and the performance information to the storage device without passing through the moving image distribution server each time the performance information is generated by the performance information generating unit, the time information indicating the time measured by the clocking unit; and
a synchronization signal transmitting unit that transmits a synchronization signal indicating the time being measured by the clocking unit to the moving image distribution server via the audio signal transmission path for the audio.

7. A performance system comprising;
a performance information output device that outputs performance information;
a storage device; and
an automatic performance device that reproduces the performance information in synchronization with a video distributed by a moving image distribution server for distributing the video and an audio,
wherein the performance information output device includes:
a performance information generating unit that generates performance information;
a clocking unit that measures time;
a first performance data transmitting unit that transmits performance data having the combination of time information and the performance information to the storage device without passing through the moving image distribution server each time the performance information is generated by the performance information generating unit, the time information indicating the time measured by the clocking unit; and
a synchronization signal transmitting unit that transmits a synchronization signal indicating the time being measured by the clocking unit to the moving image distribution server using the audio signal transmission path for the audio;
wherein the storage device includes:
a first performance data receiving unit that receives the performance data transmitted through the first performance data transmitting unit;
a storing unit that stores the performance data received by the performance data receiving unit; and
a second performance data transmitting unit that transmits the performance data stored in the storing unit to the automatic performance device without passing through the moving image distribution server in parallel with the storing of the performance data received by the storing unit; and
wherein the automatic performance device includes:
a second performance data receiving unit that receives the performance data transmitted through the second performance data transmitting unit;
a synchronization signal receiving unit that receives the synchronization signal transmitted through the synchronization signal transmitting unit from the moving image distribution server using the transmission path; and a reproducing unit that reproduces the performance information of the performance data in synchronization with the video distributed at the time when the synchronization signal is distributed, at the timing corresponding to the time indicated by the time information of the performance data received by the second performance data receiving unit and the time indicated by the synchronization signal received by the synchronization signal receiving unit.

* * * * *